Figure 1:
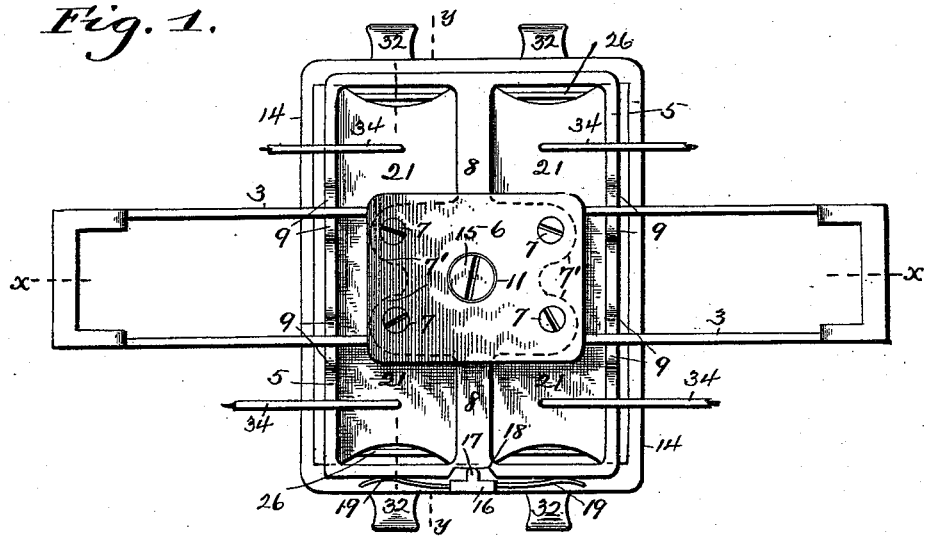

(No Model.)  J. F. McLAUGHLIN.  2 Sheets—Sheet 1.
CLOSED CONDUIT ELECTRIC RAILWAY.

No. 527,874.  Patented Oct. 23, 1894.

Witnesses:
J. B. McGirr.
F. T. Chapman.

Inventor,
James F. McLaughlin,
By Joseph Lyons
Attorney.

(No Model.) 2 Sheets—Sheet 2.
J. F. McLAUGHLIN.
CLOSED CONDUIT ELECTRIC RAILWAY.
No. 527,874. Patented Oct. 23, 1894.
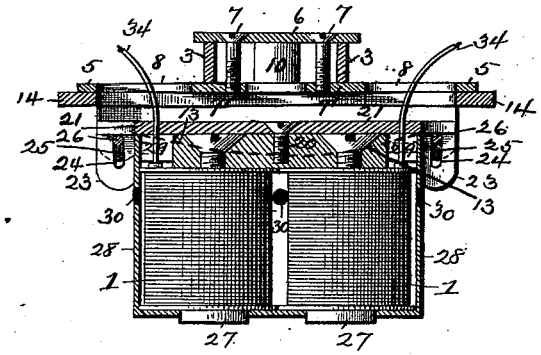
*Fig. 3.*
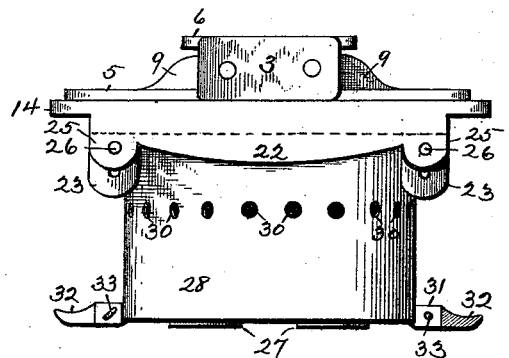
*Fig. 5.*
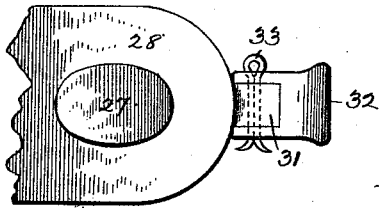
Witnesses:
J. B. McGier.
F. T. Chapman.
Inventor,
James F. McLaughlin,
By Joseph Lyons.
Attorney
THE NORRIS PETERS CO., PHOTO-LITHO., WASHINGTON, D. C.

UNITED STATES PATENT OFFICE.

JAMES F. McLAUGHLIN, OF PHILADELPHIA, PENNSYLVANIA.

CLOSED-CONDUIT ELECTRIC RAILWAY.

SPECIFICATION forming part of Letters Patent No. 527,874, dated October 23, 1894.

Application filed May 24, 1894. Serial No. 512,359. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Closed-Conduit Electric Railways, of which the following is a specification.

This invention has reference to improvements in closed conduit electric railways, in which switches or other circuit closing devices located beneath the surface of the road are operated by electro-magnets carried on the motor car.

The present invention relates more particularly to the means for suspending the operating electro-magnets on the motor car, and its object is to provide a mounting for the magnets by which they may be placed close to the surface of the road bed, and at the same time be free to adapt themselves to any undulations of or obstruction upon the road bed, and to deviations from parallelism between the rails and the conduits.

The present invention is adapted for use with any closed conduit electric railway system in which the conduit is provided either with a traveling contact maker or with pivoted or other switches contained within the conduit, for establishing the circuit between a main or supply conductor and a working conductor having sections exposed on the surface of the road, from which exposed sections the current for driving the motor upon the car is conducted to the car in any suitable manner. The contact makers are operated by magnets carried by the motor cars to establish the circuit to only those sections of the working conductor that are covered from moment to moment by the cars as they travel along the railway. Such underground systems are shown in my applications for Letters Patent, Serial No. 506,470, filed April 5, 1894, and Serial No. 510,762, filed May 10, 1894, and since the present invention has nothing whatever to do with that portion of the system which is located on or beneath the surface of the road bed, but relates only to the means for supporting the operating magnets on the motor-car truck, which magnets may be used with any other underground system similar to those shown in the before mentioned applications, no illustration of the underground portion of the system is deemed necessary in this case. In order to provide for the various conditions to which the operating magnets are likely to be subjected in the ordinary course of travel over the road bed, the magnets are so mounted that they may tilt or rise vertically, and likewise swivel laterally, and such a structure is shown in the accompanying drawings, forming part of this specification and to which reference is made in the following detailed description.

Figure 2:
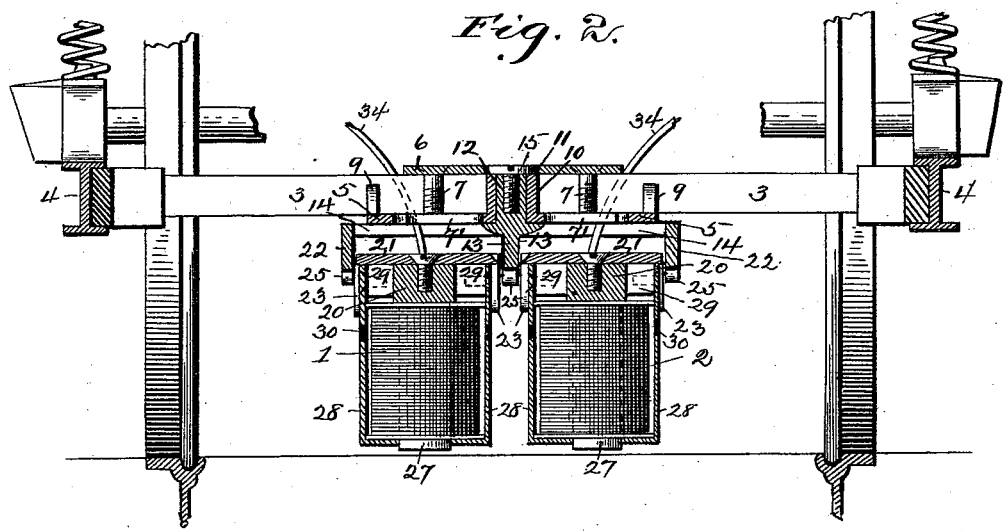

In the drawings:—Figure 1, is a top plan view of the cross beam of car truck with the magnets suspended therefrom. Fig. 2, is a cross section of the same on the line $x$—$x$ of Fig. 1, showing the cross-beam in position on the motor truck, which latter is also shown in section. Fig. 3, is a section on the line $y$—$y$ of Fig. 1. Fig. 4, is a side elevation of the magnet mounting and support, and Fig. 5, is a bottom plan view of a portion of the magnet mounting on a larger scale than the other figures.

Like numerals of reference indicate like parts throughout the drawings.

Referring to the drawings there are shown two horse-shoe electro-magnets 1, 2, supported by a mounting hereinafter described, which mounting is in turn supported by a structure secured to the middle of the cross-beam 3, which beam has its ends secured to the side bars 4 of the motor-car truck about midway of their length. The means for securing the magnet mounting to the cross beam 3, comprise a rectangular frame 5, below the beam, and a plate 6, above the beam, the said plate and frame being fastened together and clamped to the beam 3, by screws 7, countersunk into the plate 6, and entering nuts, formed in projections 7' extending from the middle rib 8 of the frame 5.

In the construction shown the beam 3, consists of two bars united at the ends by yokes, this being a common construction in motor-car trucks, and when such a truck beam is used the screws 7, are located in the space between the two bars of the beam 3, and lugs 9, formed on the frame 5, embrace these side bars as shown.

From the middle rib 8, there rises a short cylindrical hollow post 10, the upper end of which is immediately below a circular opening 11, formed in the center of the plate 6. The post 10, receives a cylindrical stud or pintle 12, rising from the central rib 13, of a rectangular frame 14, similar in shape to, but of somewhat larger dimensions than the frame 5. The frame 14, is held against the under side of the frame 5, by means of a screw 15, entering a nut formed in the stud 12, and provided with a large head contained within the opening 11, of the plate 6, and bearing upon the upper end of the post 10. The stud 12, together with the post 10, and screw 15, constitutes a swivel connection between the frames 5 and 14, whereby the frame 14, is free to turn in a horizontal plane below the frame 5, the latter being held against rotation by its connection to the cross bar 3. The extent of the swiveling movement of the frame 14, is limited by a block 16, thereon having a tongue 17, entering a recess 18, formed in the frame 5; the block 16, being located at one end of the frame 14, and the recess 18, being formed in the corresponding end of the frame 5. Projecting from each side of the block 16, are springs 19, bearing against the corresponding end of the frame 5, and these springs while permitting the swivel-frame 14 to turn in its bearings, retard such movement to a limited extent and thereby act as a brake against any quick or rapid displacement of the frame thus preventing jarring and noise.

Since it is desirable to place the magnets with their poles close to the road bed so as to act with the greatest possible efficiency on the circuit closing devices beneath the surface of the road, and since the road bed will in the course of time and from various causes become more or less uneven, and obstructions such as sticks and stones are often present on the road bed in the path of the magnets, it is necessary to so suspend the latter that they will ride freely over obstructions and will yield readily should they come in contact with any portion of the road bed. For this purpose I provide each horse-shoe magnet with a mounting so hung from the swivel frame 14, that it will not only participate in the movement of the frame around its pivot but will tilt and move bodily up and down independent of any movement of the said frame 14, and of the other magnet mounting. Each magnet has its yoke 20, rigidly secured by screws to the middle of a rectangular plate 21, of such size that it will fit loosely between the middle rib 13, of the frame 14, and stiffening side ribs 22, formed on said frame 14, parallel with the rib 13. Each plate 21, has formed on it at its corners, downwardly projecting ears 23, parallel to each other at the corresponding ends of the plate, and each provided with a longitudinal slot 24.

The frame 14, has formed on it, at the ends of the ribs 13 and 22, downwardly projecting ears 25, there being three ears, parallel to each other at each end of the frame. The ears 25, receive between them the ears 23, of the plates 21, and rods 26, fast in the ears 25, pass through the slots 24, in the ears 23, and thereby support or sustain the plates 21, and magnets secured thereto. The magnets so mounted will tilt both sidewise and longitudinally and will rise bodily in order to pass obstructions, but the unprotected magnets would be liable to injury from contact with such obstructions. Consequently I inclose them in protective casings, which, together with the plates 21, constitute yielding magnet mountings.

The magnet cores 27, are preferably elliptical in cross-section, as shown, and the protective casings 28, conform generally to the outlines of the magnets, as indicated in Fig. 5. The bottoms of the casings are closed and are pierced by the poles of the magnets which poles may be flush with or project slightly beyond the bottom. The upper ends of the casings are closed by the plates 21, each plate being provided with lugs 29, entering the corresponding casing and receiving screws (see dotted lines Figs. 2 and 3) passing through and securing the casing to the lugs. The casings are made of non-magnetic material, such as brass or bronze and are provided with ventilating perforations 30.

Cast on and projecting from the lower edge of each casing, at the front and rear thereof, are square lugs 31, receiving shoes 32, each of which is formed with a broad upwardly curved toe, and a bifurcated heel embracing the lug, and to which it is removably secured by means of a spring cotter 33, or in any other manner. It is quite evident that this shoe might be cast in one piece with the casing, but I prefer to construct it substantially in the manner described, for it may then be easily and cheaply renewed in case it becomes broken, and may also be made of cast iron, which is much cheaper than brass or bronze or other like non-magnetic material used in the construction of the casing.

Should there be an obstruction on or unevenness of the road bed in the path of the magnets, the forward shoe or shoes 32, will come in contact with the obstruction or with the road bed where it is uneven, and the front end of the magnet mounting or mountings will be lifted thereby, the said casing moving around the rod 26, at the rear end of the frame 14, as a pivot or hinge, and as the obstruction on or unevenness of the road bed is passed over, the entire magnet mounting will be lifted bodily, then the forward end will settle down to its first position and finally as the rear shoe passes from over the obstruction, that end of the mounting will drop, moving around the other rod 26, as a hinge or pivot.

Should an obstruction strike the casing at one side of the shoe 32, the magnet mounting may swing pendulously, laterally; or it may turn in a horizontal plane since the frame 14, from which it is hung is free to move for a limited distance on its pivot against the springs 19. This swiveling motion is more particularly designed to permit the magnets to follow the sinuosities of the underground conduit due to imperfect parallelism between the latter and the track rails, especially on curves. In such cases the magnets will automatically turn with the frame 14, about the central pivot of the latter, by magnetic attraction to the underground armature and will thus be maintained in good operative relation to the underground contact maker.

The terminal conductors 34, of each magnet are carried up through the corresponding plate 21, and are connected in any suitable way with a source of energizing currents for the magnets, but this forms no part of the present invention.

It will be readily understood that I am by no means confined to the exact details of the construction shown and described, for mounting the magnets, since I may vary the construction so long as the magnets are free to swing in two vertical planes and to rise and fall bodily.

I may use a single electro-magnet and place the same either on one side of the central working conductor or straddling the same, but in either case the mounting for the magnet will be, in all essential particulars, the same as that hereinbefore described.

Having now fully described my invention, I claim and desire to secure by Letters Patent—

1. In an electric railway, electro magnets hung from a motor car and pivoted to tilt in the direction of the line of travel and also at right angles thereto, substantially as described.

2. In an electric railway, electro-magnets hung from a motor car and free to tilt and to swivel in a horizontal plane, substantially as described.

3. In an electric railway, a swivel-frame secured to a motor truck and one or more electro-magnets hung from the swivel-frame and free to tilt, substantially as described.

4. In an electric railway, an electro magnet provided with a mounting having slotted ears at each end, and rods secured to a motor car and passing through said ears for supporting the magnet pendulously, substantially as described.

In testimony whereof I have signed my name to this specification in the presence of two subscribing witnesses.

JAMES F. McLAUGHLIN.

Witnesses:
MICHAEL G. PLUNKETT,
CHAS. H. WHITE.